Patented July 5, 1949

2,474,989

UNITED STATES PATENT OFFICE 2,474,989

INJECTABLE IRON PREPARATION AND PROCESS FOR THE MANUFACTURE OF SAME

Otto Schnider, Basel, Switzerland, assignor to Hoffmann-La Roche Inc., Nutley, N. J., a corporation of New Jersey No Drawing. Application June 9, 1945, Serial No. 598,657. In Switzerland July 7, 1944

13 Claims. (Cl. 167—68)

So far only very few iron preparations which can be employed parenterally have become known. On being administered orally, iron salts are only slowly resorbed or, in many cases, disturbing side-actions set in. Considerable disadvantages accompany the iron compounds used for injection purposes up to now. These disadvantages are mainly due to the fact that the preparations either exert an injurious action on the organism if they are not employed in a highly diluted form, or are only of insignificant therapeutic value in view of the fact that the iron is bound too closely in the complex.

It has now been found that the complex di-($\alpha,\gamma$-dihydroxy-$\beta,\beta$-dimethyl-butyrato)-ferric acid represents an iron compound which, when being injected in the form of a neutralised solution, shows an effect corresponding to its iron content; also in higher concentrations it is tolerated without any side-action. The complex di-($\alpha,\gamma$-dihydroxy-$\beta,\beta$-dimethyl-butyrato)-ferric acid is obtained, for instance, by reacting ferric sulfate with alkali earth metal salts of $\alpha,\gamma$-dihydroxy-$\beta,\beta$-dimethyl-butyric acid in aqueous solution, separating the solution from the precipitated alkali earth sulfate, evaporating said solution of the ferric complex of $\alpha,\gamma$-dihydroxy-$\beta,\beta$-dimethyl-butyric acid to dryness, dissolving and reprecipitating the residue from organic solvents. Neutral aqueous solutions can be prepared therefrom.

The new acid is a yellowish brown, non-hygroscopic powder which is easily soluble in water giving an acid reaction. It is also easily soluble in methyl alcohol and ethyl alcohol, insoluble in acetone and ether. In view of the constitution adopted for ferric compounds of other hydroxy acids (Gmelin's Handbuch der anorganischen Chemie, 8th edition, Iron, part B, page 531), the following formula can be ascribed to it:

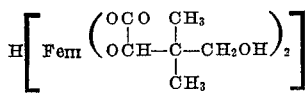

With alkali, the acid forms yellowish brown salts which are easily soluble in water giving a neutral reaction. In the usual organic solvents they are difficultly soluble. Contrary to most organic iron salts, these alkali salts are extraordinarily stable. The neutral solutions can be sterilised by heating. They are very well suited for the parenteral iron therapy.

The di-($\alpha,\gamma$-dihydroxy-$\beta,\beta$-dimethyl-butyrato)-ferric acid is to be employed in neutralised solution as medicinal preparation.

Example 135 parts by weight of the barium salt of $\alpha,\gamma$-dihydroxy-$\beta,\beta$-dimethyl-butyric acid

are dissolved in 1350 parts of water and, while stirring, a solution of about 45 parts by weight of ferric sulphate ($Fe_2(SO_4)_3.3H_2O$) in 300 parts of water is added drop by drop at room temperature until neither barium ions nor sulphate ions can be traced in the solution. The product is then separated from the barium sulphate by filtration by suction and the yellowish brown solution concentrated in vacuo to dryness. The remaining, slightly brown crystal cake is dissolved in double the quantity of methyl alcohol under slight heating and the di-($\alpha,\gamma$-dihydroxy-$\beta,\beta$-dimethyl-butyrato)-ferric acid precipitated therefrom with acetone. It is filtered by suction and dried. A light-yellowish brown powder is obtained which, on heating above 150° C., slowly begins to become brown.

By neutralization with sodium carbonate or sodium bicarbonate in aqueous solution, whereby the equivalent quantity of sodium replaces the free hydrogen atom in the compound as represented by the hereinabove-mentioned formula, brown heat-resistant solutions of the sodium salt of the ferric acid are obtained. By concentration in vacuo, the solid, yellowish-brown sodium salt of the di-($\alpha,\gamma$-dihydroxy-$\beta,\beta$-dimethyl-butyrato)-ferric acid is obtained therefrom. For therapeutic use the neutralized solution can be directly employed without isolation of the salt.

I claim:

1. An injectable iron preparation consisting of a neutralized solution of the complex di-($\alpha,\gamma$-dihydroxy-$\beta,\beta$-dimethyl-butyrato)-ferric acid.

2. An injectable iron preparation consisting of a neutralized aqueous solution of the complex di-($\alpha,\gamma$-dihydroxy-$\beta,\beta$-dimethyl-butyrato)-ferric acid.

3. A process for the manufacture of an injectable iron preparation, comprising reacting an alkaline earth salt of $\alpha,\gamma$-dihydroxy-$\beta,\beta$-dimethyl-butyric acid with ferric sulfate in aqueous solution, evaporating the solution to dryness, dissolving the residue in an organic solvent in which it is soluble and reprecipitating the residue by addition of an organic solvent in which it is insoluble, and neutralizing the precipitate with an alkali in aqueous solution to form a neutral solution.

4. A process for the manufacture of an injectable iron preparation comprising reacting the barium salt of α,γ-dihydroxy-β,β-dimethyl-butyric acid with ferric sulfate in aqueous solution, separating the solution from the barium sulfate formed, evaporating the solution to dryness, dissolving the residue in an organic solvent in which it is soluble and reprecipitating the residue by addition of an organic solvent in which it is insoluble, and neutralizing the precipitate with an alkali in aqueous solution to form a neutral solution.

5. A process as in claim 4 in which the last step comprises neutralizing the precipitate to form a neutral aqueous solution of the sodium salt thereof.

6. A process of reacting an alkaline earth salt of α,γ-dihydroxy-β,β-dimethyl-butyric acid with ferric sulfate in aqueous solution to form the ferric complex of α,γ-dihydroxy-β,β-dimethyl-butyric acid.

7. A process as in claim 6, which includes the step of neutralizing the ferric complex with an alkali to form an alkali metal salt of the ferric complex of α,γ-dihydroxy-β,β-dimethyl-butyric acid.

8. A process which comprises reacting the barium salt of α,γ-dihydroxy-β,β-dimethyl-butyric acid with ferric sulfate in aqueous solution to form the ferric complex of α,γ-dihydroxy-β,β-dimethyl-butyric acid.

9. A process as in claim 8 which includes the step of neutralizing the ferric complex to form the sodium salt of the ferric complex of α,γ-dihydroxy-β,β-dimethyl-butyric acid.

10. A compound of the group consisting of di-(α,γ-dihydroxy-β,β-dimethyl-butyrato)-ferric acid and an alkali metal salt thereof.

11. The sodium salt of di-(α,γ-dihydroxy-β,β-dimethyl-butyrato)-ferric acid.

12. An injectable iron preparation consisting of an neutral solution of an alkali metal salt of di-(α,γ-dihydroxy-β,β-dimethyl-butyrato)-ferric acid.

13. An injectable iron preparation consisting of a solution of the sodium salt of di-(α,γ-dihydroxy-β,β-dimethyl-butyrato)-ferric acid.

OTTO SCHNIDER.

REFERENCES CITED

The following references are of record in the file of this patent:

UNITED STATES PATENTS

| Number | Name | Date |
|---|---|---|
| 1,508,448 | Glaeser | Sept. 16, 1924 |
| 1,888,186 | Stoll | Nov. 15, 1932 |
| 2,081,547 | Mattheus | May 25, 1937 |

FOREIGN PATENTS

| Number | Country | Date |
|---|---|---|
| 335,965 | Great Britain | Oct. 6, 1930 |
| 762,592 | France | Jan. 22, 1934 |

OTHER REFERENCES

Gmelin, "Handbuch der anorganischen Chemie," 8th ed., Eisen, part B, pages 537–539.